United States Patent [19]

Smither

[11] Patent Number: 5,004,319
[45] Date of Patent: Apr. 2, 1991

[54] CRYSTAL DIFFRACTION LENS WITH VARIABLE FOCAL LENGTH

[75] Inventor: Robert K. Smither, Hinsdale, Ill.

[73] Assignee: The United States of America as represented by the Department of Energy, Washington, D.C.

[21] Appl. No.: 291,916

[22] Filed: Dec. 29, 1988

[51] Int. Cl.$^5$ .................. G02B 26/00; G02B 27/44; G02B 5/18; G21K 1/06

[52] U.S. Cl. ............... 350/162.21; 350/607; 350/610; 350/360; 350/162.17; 378/84; 378/145

[58] Field of Search ............ 350/607, 610, 162.24, 350/162.21, 162.17, 162.11, 359, 360; 378/145, 84

[56] References Cited

U.S. PATENT DOCUMENTS

| | | | |
|---|---|---|---|
| 2,853,617 | 9/1958 | Berreman | 250/51 |
| 4,190,327 | 2/1980 | Hughes | 350/610 |
| 4,253,739 | 3/1981 | Carlson | 350/610 |
| 4,314,742 | 2/1982 | Dye et al. | 350/310 |
| 4,382,657 | 5/1983 | Lemaitre | 350/607 |
| 4,415,234 | 11/1983 | Meyers | 350/609 |
| 4,426,131 | 1/1984 | Gowan | 350/162.2 |
| 4,429,411 | 1/1984 | Smither | 378/84 |
| 4,461,018 | 7/1984 | Ice et al. | 378/84 |
| 4,737,973 | 4/1988 | Ogawa et al. | 378/84 |

Primary Examiner—Bruce Y. Arnold
Assistant Examiner—David R. Parsons
Attorney, Agent, or Firm—Helen S. Cordell; John M. Albrecht; William R. Moser

[57] ABSTRACT

A method and apparatus for altering the focal length of a focusing element to one of a plurality of pre-determined focal lengths by changing heat transfer within selected portions of the element by controlled quantities. Control over heat transfer is accomplished by manipulating one or more of a number of variables, including: the amount of heat or cold applied to surfaces; type of fluids pumped through channels for heating and cooling; temperatures, directions of flow and rates of flow of fluids; and placement of channels.

19 Claims, 12 Drawing Sheets

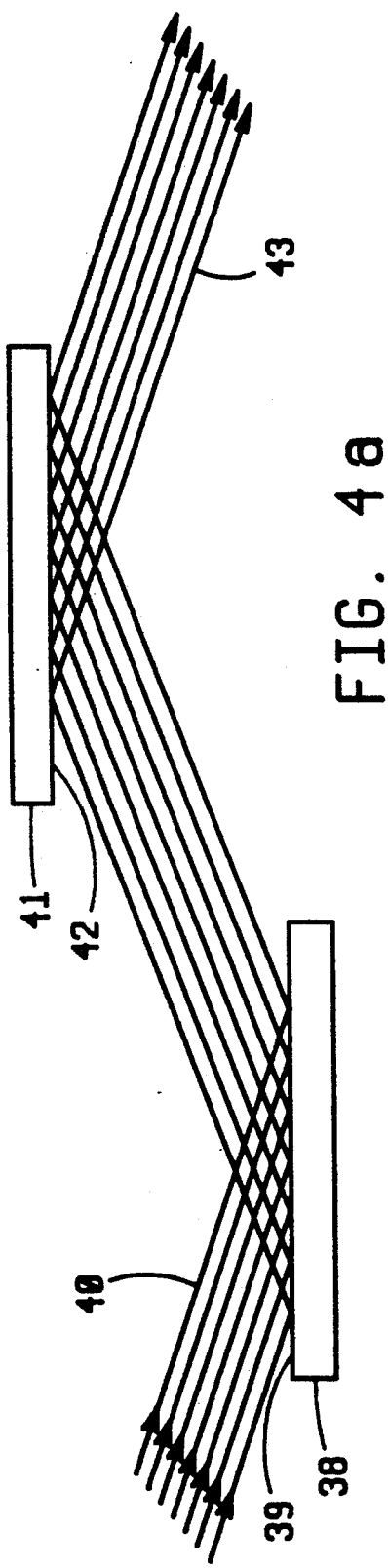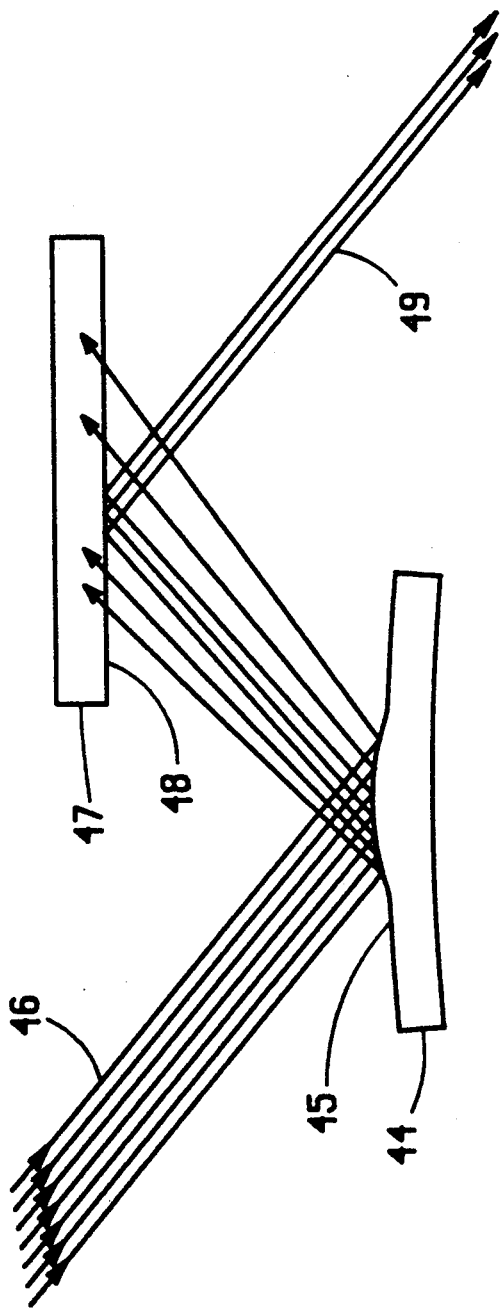
FIG. 4a
FIG. 4b

CRYSTAL DIFFRACTION LENS WITH VARIABLE FOCAL LENGTH

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to a method and apparatus for the control of the shape of a planar structure, and in particular to an instrument in which thermal gradients are used to control the shape of the surface of a diffraction crystal.

It is well known in the prior art that photons may be focused by specular reflection from mirror surfaces and by diffraction from crystallographic planes. Instruments incorporating these features include spectrometers, medical devices used to focus or increase the intensity of a beam for treatment purposes, satellite telescopes used for focusing parallel beams of photons such as x-rays and gamma rays from deep space, and devices useful for research purposes where beams of photons or particles are directed against samples to determine particular characteristics of the samples.

Mirrors have been used in these instruments to direct and to focus beams of photons because they can be fabricated in various curvatures, thereby providing precise control over the direction and shape of the beams. In instruments where complex focusing is required, mirrors can be fabricated as both cylindrical and ellipsoidal surfaces and can be used to obtain both single and double focusing.

However, mirrors can be used conveniently only in instruments utilizing low energy photon beams. Mirrors work well for energies below 10 keV and are useful for energies between 10 and 20 keV. Above 20 keV mirrors become very impractical because extremely large mirrors are required to accomplish even minor changes in angles of reflection. The maximum angle of reflection, $\theta_{max}$, of photons from a mirror is given by the relation:

$$\sin\theta_{max} = A/E \tag{1}$$

where "A" is a constant that is a characteristic of the reflecting surface, and "E" is the energy of the photons. For small angles this relation becomes:

$$\theta_{max} = A/E \tag{2}$$

If the energy of the incident photons is 20 keV and the reflecting surface is platinum, the maximum angle of reflection is about 0.0030 radians. A parallel beam of photons, 1 cm high, would require a mirror 333 cm (11 ft) long to reflect it and a mirror two to three times as long (22 to 33 ft) to focus it at some reasonable distance. If the photon beam were not parallel but diverging by 0.001 radians, as would be the case for a point source at a distance of 12 m, the mirror would have to be 500 cm long to reflect it and at least 1000 cm (33 ft) long to focus it. If the divergency of the beam were greater than the critical angle (0.0030 radians) then no length of mirror would be long enough to focus the full beam.

Because of this practical limitation, diffraction crystals are more suitable for use at energy levels above 20 keV. Theoretically, the range of energies in which diffraction crystals can be used is limited only at the low end. Diffraction will occur if the Bragg condition for diffraction is satisfied based on the equation:

$$n\lambda = 2d \sin\theta$$

where "n" is the order of diffraction, "$\lambda$" is the wavelength of the photons, "d" is the crystalline plane spacing, and "$\theta$" is the Bragg angle or incident angle. An incident beam will not be diffracted if the wavelength of the beam is longer than twice the distance between the crystalline planes.

The use of bent diffraction crystals has been limited, however, because bending of diffraction crystals has not been easily accomplished. Presently most bent crystals are bent with mechanical forces applied to the surface of the crystal. The bend is almost always only in one plane and compound curves such as spherical and ellipsoidal surfaces are very difficult to obtain (see U.S. Pat. Nos. 2,853,617 issued Sept. 23, 1958 to D. W. Berreman, 4,461,018 issued July 17, 1984 to Ice et al., and 4,737,973 issued Apr. 12, 1988 to Ogawa et al.).

It is an object of this invention to provide a method and apparatus for shaping the surface of a diffraction crystal without mechanical bending.

It is another object of this invention to provide a method and apparatus for controlling the shape of the surface of a diffraction crystal so that the crystal will function as a variable focus crystal diffraction lens.

It is another object of this invention to provide an instrument in which thermal gradients are used to control the shape of the surface of a diffraction crystal.

Additional objects, advantages and novel features of the invention will become apparent to those skilled in the art upon examination of the following and by practice of the invention.

SUMMARY OF THE INVENTION

To achieve the foregoing and other objects, the invention comprises a method and apparatus for creating a thermal gradient between the major surfaces of a diffraction crystal, and for bending the diffraction crystal. Heat and cold directed at the surfaces of a diffraction crystal lens, and fluids pumped at controlled rates and temperatures through channels in a diffraction crystal lens are used to alter the shape of the surface of the lens and to vary the focal length of the lens so that it will function as a variable focus crystal diffraction lens. In one embodiment, thin film resistors are made to adhere to the surface of a diffraction crystal, and a computer controls generation of heat at and through the surface. In other embodiments, liquid gallium metal is used as a cooling and heating fluid, because of its high thermal conductivity and high volume specific heat; other appropriate heating and cooling fluids could be used.

BRIEF DESCRIPTION OF THE DRAWINGS

The present invention is depicted in the accompanying drawings and graphs.

FIGS. 4a and 4b respectively depict flat diffraction crystals positioned in a crystal monochromator and the deformation of a crystal due to heat generated by a photon beam.

DETAILED DESCRIPTION OF THE INVENTION

If a crystal is unstressed, the unit cells are all oriented in the same direction and the lattice structure defines atomic planes which are flat. In such case, plane and parallel incident x-rays are diffracted in other plane and parallel directions. Bending the crystal allows focusing of the x-rays, thereby making detection of the diffracted beam more efficient and often increasing the beam's intensity. However, mechanical bending may result in such stressing of the lattice structure of the crystal that irregular deformations will occur, seriously limiting the sharpness of focus.

The current invention substitutes thermal for mechanical stress, thereby enabling more uniform and regular deformation of the atomic planes.

Figure 1:
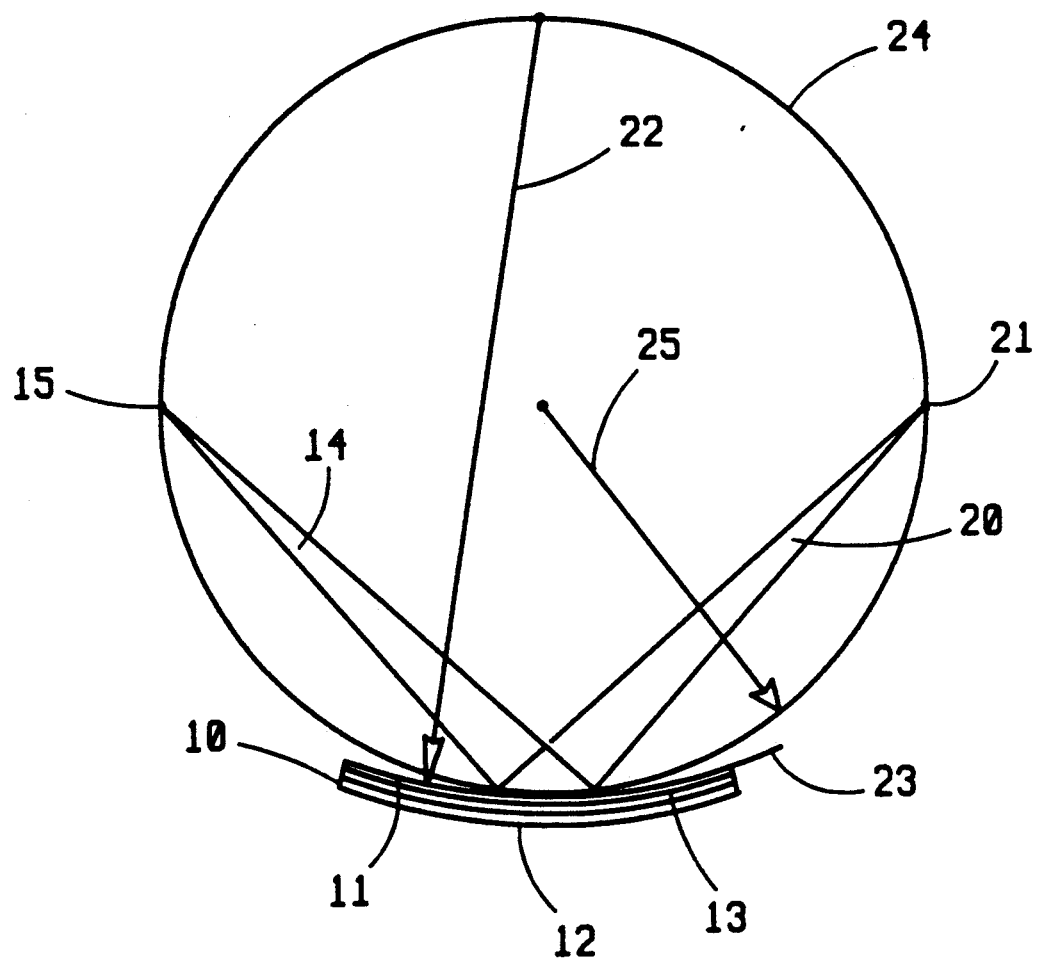
FIG. 1 is a diagram of the focal circle of a bent crystal diffraction lens.

FIG. 1 illustrates the principles of crystal diffraction by a bent single focusing crystal diffraction lens of the reflection type. Beam 14 from a point source 15 is directed to face 11 of crystal 10 and diffracted by planar spacing 13 to form diffracted beam 20 and line image 21. As illustrated, the radius 22 of the arc 23 for the bent crystal 10 is twice the radius 25 of the focal circle 24.

Figure 2A:
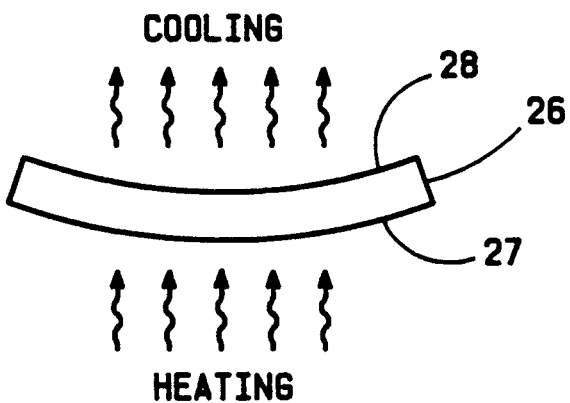
FIGS. 2a and 2b depict crystal diffraction lenses which are bent after heat and cold are directed at the surfaces of the lenses.

As illustrated in FIG. 2a, if heat is added uniformly to the back face 27 of a crystal 26 and removed uniformly from the front face 28, the front face 28 of the crystal will be concave with a radius of "R" where "R" is given by:

$$R = L/\alpha \Delta T \quad (4)$$

where "L" is the thickness of the crystal 26 and "$\alpha$" is the coefficient of thermal expansion and $\Delta T$ is the temperature difference between the front face 28 and the back face 27 of the crystal.

$$\Delta T = T_2 - T_1 \quad (5)$$

is given by the relation:

$$\Delta T = Q L/k \quad (6)$$

where "Q" is the heat per unit area being added to the back face 27, "L" is the thickness of the crystal 26 and "k" is the thermal conductivity of the crystal 26. By combining equations (4) and (6) one has the following relation for "R":

$$R = k/\alpha Q \quad (7)$$

Note that this relationship is independent of the thickness of the crystal 26 and depends only on the parameters of the crystal 26 and the heat flow "Q" through the crystal 26.

The focal length of the crystal 26 depends on the Bragg diffraction angle "$\theta$" of the photons as well as the radius of curvature of the crystal "R" and is given by the relationship:

Focal length = Radius of Curvature of Crystal $\times \sin \theta$ $$\text{Focal length} = R \sin \theta \quad (8)$$

where the focal length is defined as the distance from the source to the crystal which is equal to the distance from the crystal to the image for the symmetric focusing case. Note that for a simple lens this is usually defined as twice the focal length.

Substituting the value for "R" from the equation (7) one has the following relation:

$$\text{Focal length} = k \sin \theta / \alpha Q \quad (9)$$

Thus the value of the focal length can be changed by changing the value of "Q", the heat flow in the crystal 26. Note that "$\sin \theta$" is defined by the Bragg condition:

$$\sin \theta = 2d / n\lambda \quad (3)$$

If $\Delta T = 50°$ C. and $L = 1.5$ cm and $\alpha = 3 \times 10^{-6}$ (for silicon), then $R = 10$ m (see equation (4)) and the focal length = 10 m $\times \sin \theta$.

Theoretically, then, it is possible to vary the focal length of a crystal diffraction lens by applying heat to the back face 27 and cooling to the front face 28 of the crystal 26 to establish a temperature gradient between the major surfaces of the crystal 26.

Figure 2B:
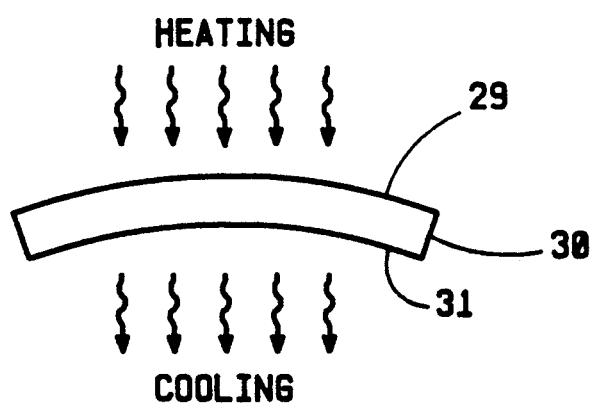

Referring to FIG. 2b, if the heat is added uniformly to the front face 29 of the crystal 30 and the crystal 30 is cooled on its back face 31, then the front face 29 of the crystal 30 will become convex. This will tend to defocus (spread out) an incident photon beam. The convex radius of curvature can be calculated from the above equations just as the concave radius is calculated, except that $\Delta T$ is now negative.

$$R = L/\alpha \Delta T \quad (4)$$

$$\Delta T = Q L/k \quad (6)$$

$$R = k/\alpha Q \quad (7)$$

Figure 3A:
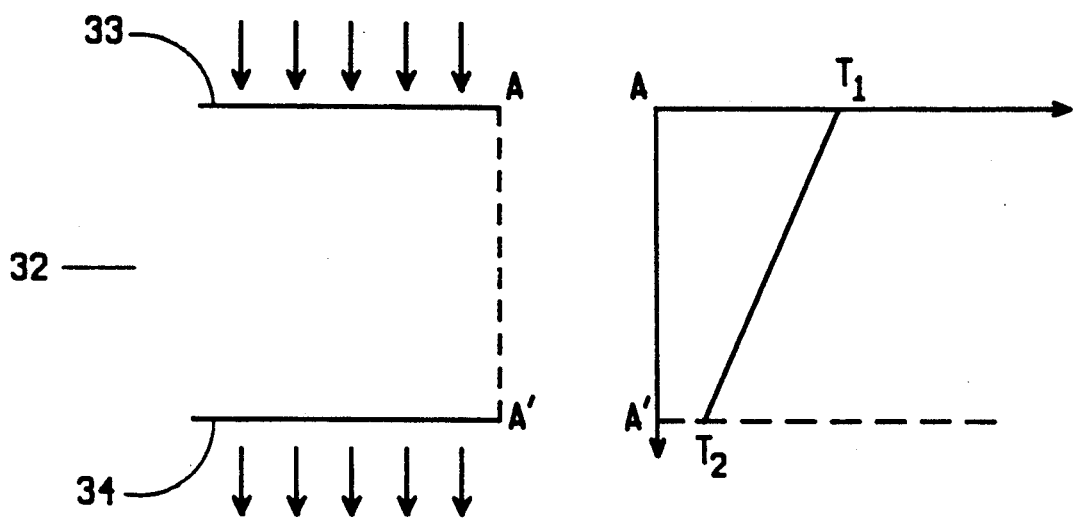
FIGS. 3a and 3b are schematics and graphs comparing the thermal profile in crystal diffraction lenses using surface cooling (FIG. 3a) and cooling by pumping a fluid through a lens (FIG. 3b).

An understanding of heat transfer in the planar structure of the crystal diffraction lens suggests a further embodiment of the present invention. As depicted schematically and graphically in FIG. 3a, a crystal diffraction lens 32 is heated on its front face 33 and cooled on its back face 34. A negative thermal gradient ($T_2 - T_1$) is established uniformly between the surfaces of the crystal lens 32 and the lens 32 is thermally bent as a convex lens.

Figure 3B:
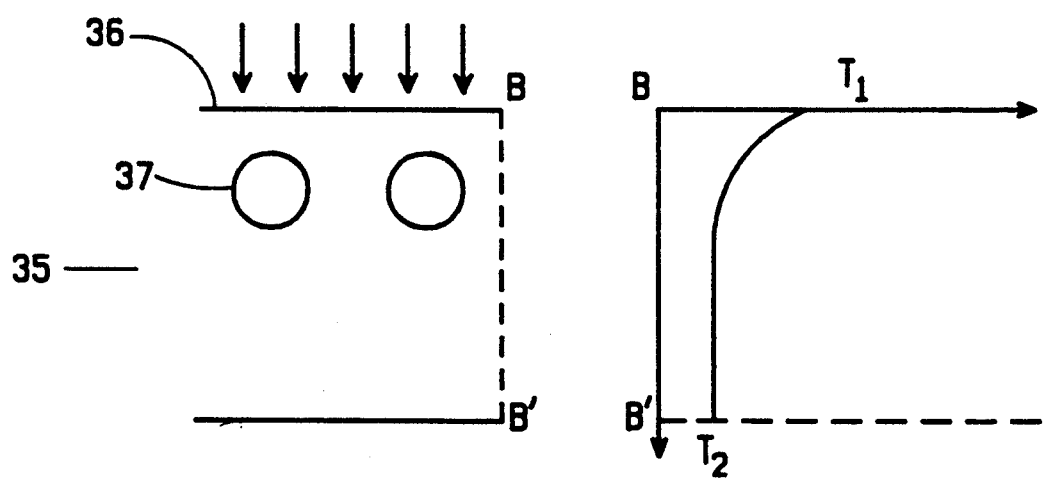

In the further embodiment of FIG. 3b, cylindrical channels are drilled in the crystal lens 35 in one row 37, parallel to the major surfaces of the crystal 35. If the lens 35 is then heated on its front face 36 and a cooling fluid is passed through row 37 of cylindrical channels, heat transfer through the crystal lens 35 is not uniform. The temperature gradient ($T_2 - T_1$) between the planes of the crystal lens 35 will then vary with the depth within the crystal lens 35 and the bending of the crystal lens 35 will be less than that of the crystal in FIG. 3a.

If the heat is not added uniformly to the surface of the crystal 30 but rather in a small spot as it would be from a undulator beam from a synchrotron, then the surface temperature will vary from point to point on the crystal surface. This will generate both a bending or bowing of the crystal surface and a thermal bump on the surface caused by the non-uniform expansion of the crystal near the surface. This results in dispersion of the diffracted beam and loss in the beam intensity when used in a two crystal monochromator.

FIGS. 4a and 4b illustrate the effects of deformation of a single focusing crystal diffraction lens by the imposition of non-uniform heat to the surface of the crystal. In FIG. 4a, two flat diffraction crystals 38 and 41 are positioned in a crystal monochromator. A parallel incident beam 40 is diffracted from the face 39 of crystal 38 to the face 42 of crystal 41. The resultant beam 43 is a monochromated beam with intensity approximately equal to that of the beam diffracted by the first crystal 38.

As illustrated in FIG. 4b, if non-uniform heat is added to the face 45 of the crystal 44, the parallel or near parallel incident beam 46 will be diffracted by the deformed face 45 and only partially diffracted by the face 48 of the second crystal 47. The resultant beam 49 is likely to be less parallel and of less intensity.

Figure 5A:
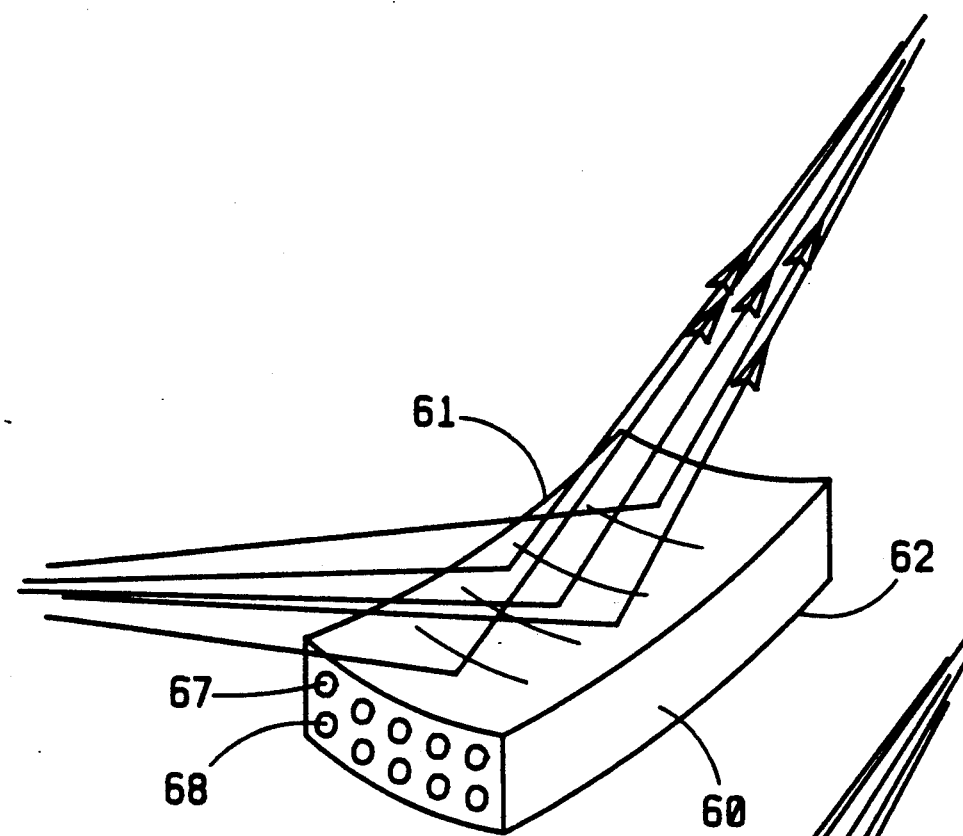
FIGS. 5a, 5b and 5c show channels drilled through single focusing crystal diffraction lenses, preparatory to implementation of the present invention.
Figure 5B:
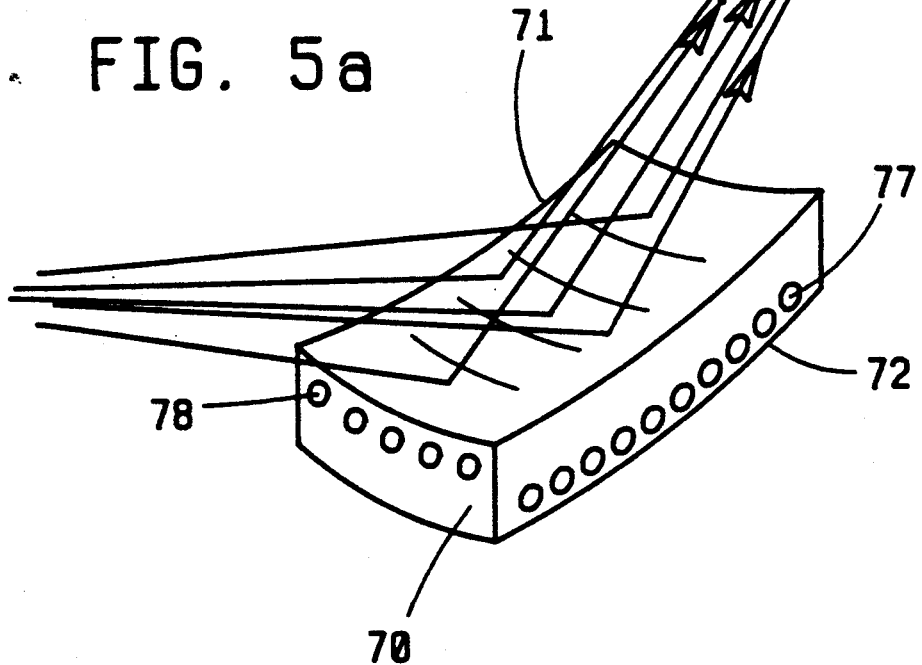
Figure 5C:
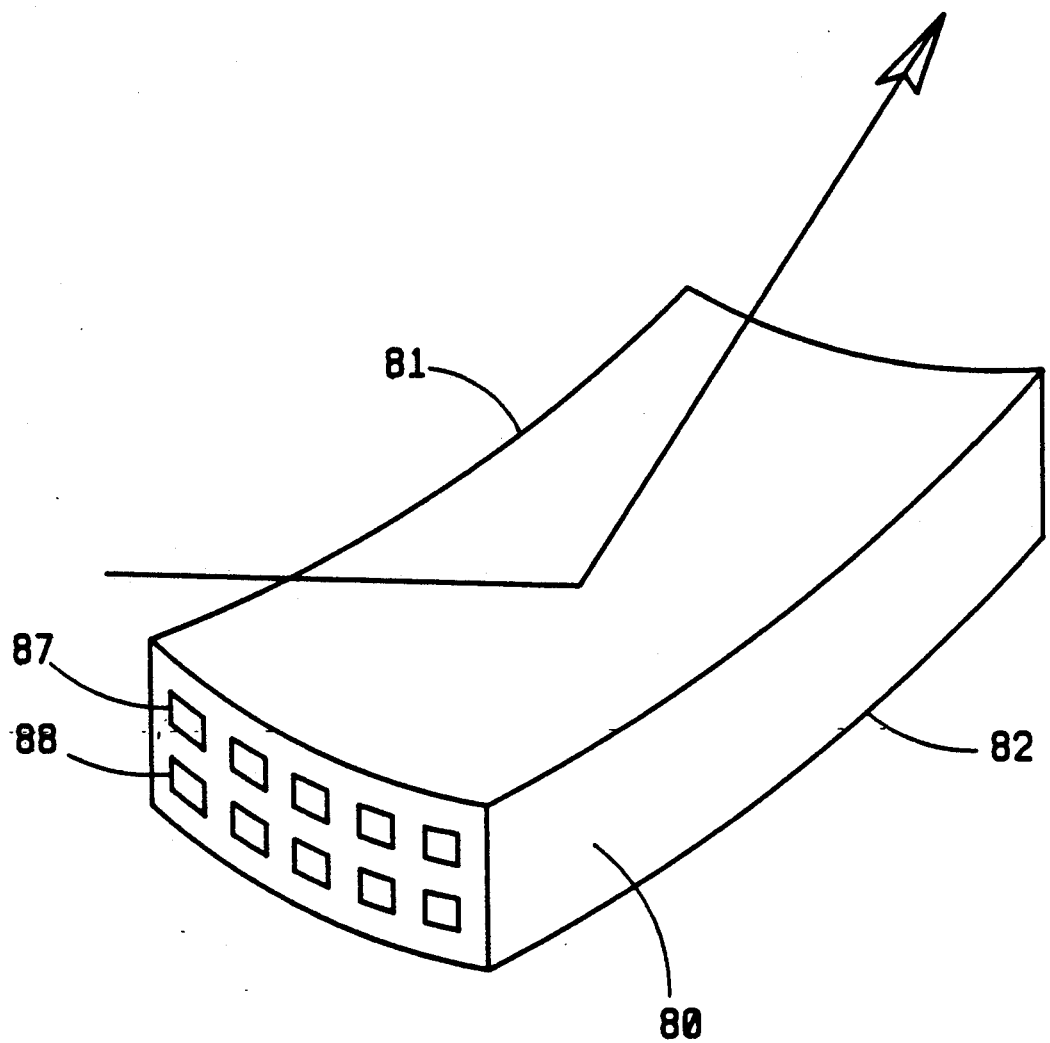

The present invention provides a method and apparatus not only for offsetting deforming heat but also for increasing control over the surface shape of the crystal. FIGS. 5a, 5b, and 5c depict crystals prepared for use in the present invention. In FIGS. 5a, 5b, and 5c, channels were drilled into Si (1,1,1) crystals 60, 70, and 80, respectively, which are single focusing diffraction crystals eight centimeters square and two centimeters deep.

In FIG. 5a, cylindrical channels 0.5 cm in diameter were drilled in crystal 60 in two rows 67 and 68 parallel to each other and to the crystal's major surfaces 61 and 62. Within each row, the channels are spaced 1.0 cm center to center.

In FIG. 5b, cylindrical channels 0.5 cm in diameter were drilled in crystal 70 in two rows 77 and 78 perpendicular to each other and parallel to the crystal's major surfaces 71 and 72. Again, the channels are spaced 1.0 cm center to center.

In FIG. 5c, rectangular channels 0.5 cm on each side were drilled in crystal 80 in two rows 87 and 88 parallel to each other and to the major surfaces 81 and 82. There is a space 0.5 cm wide between each two channels.

By pumping appropriate cooling and heating fluids at controlled temperatures and rates of flow through the appropriately placed channels the present invention controls heat transfer throughout the crystal and by establishing preferred temperature gradients controls the shape of the surface of the diffraction lens.

Figure 6A:
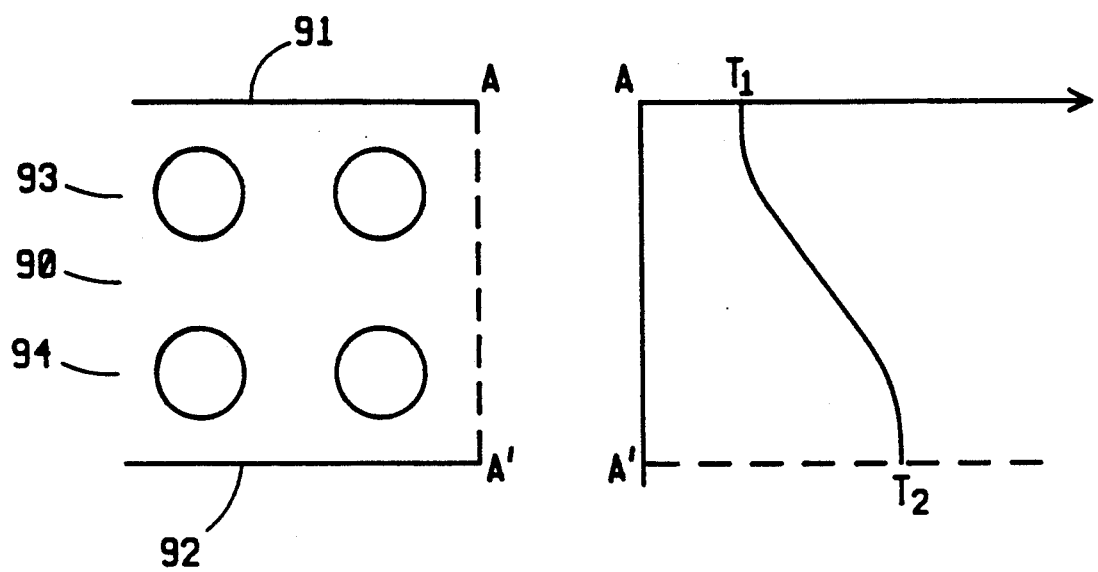
FIGS. 6a and 6b are schematics that show the cross section of a crystal and the corresponding temperature profile, A - A', through the crystal when cooling/heating fluids are pumped through the two sets of cooling-/heating channels; when the fluid flowing in the lower channels is warmer than the fluid flowing in the upper channels (FIG. 6a) and when the fluid flowing in the upper channels is warmer than the fluid flowing in the lower channels (FIG. 6b), for the case where the two sets of channels are parallel to each other.
Figure 6B:
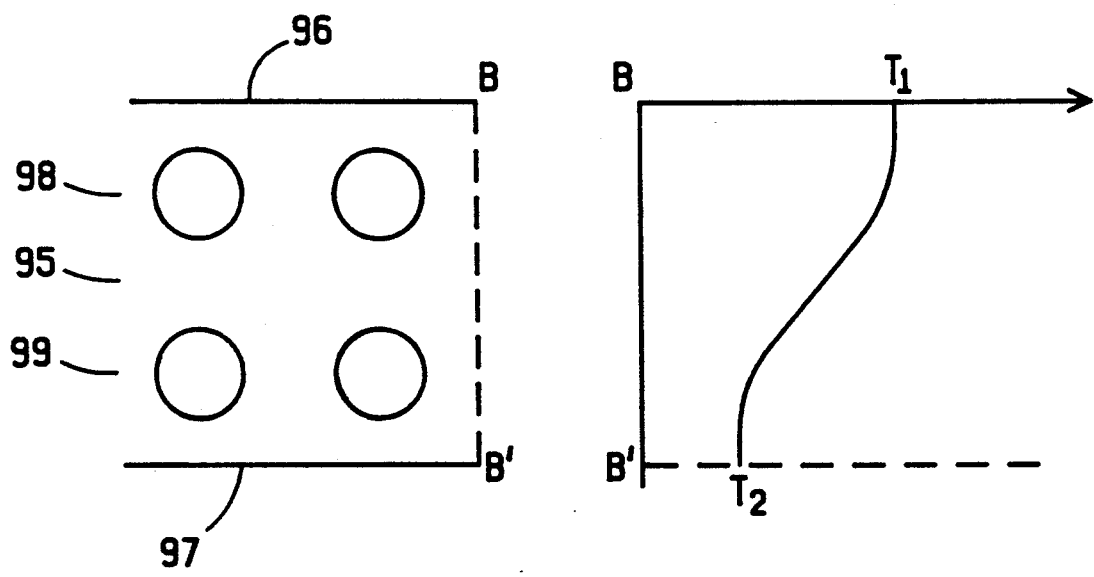

FIGS. 6a and 6b illustrate an embodiment of the invention and the effect of heat transfer which results from pumping fluids at equal rates and unequal temperatures in the same or opposite directions through two channels in a crystal. In FIG. 6a, cylindrical channels 0.5 cm in diameter were drilled in two rows 93 and 94 in crystal 90, a silicon (1,1,1) single focusing crystal 8 cm square and 2 cm deep. Each row of channels is 25 mm from the nearer major surface. The channels are spaced 1.0 cm center to center. Liquid gallium was pumped into row 93 at 40° C. and into row 94 at 90° C., the resulting temperature gradient ($T_2 - T_1$) between the back face of the crystal 91 and the front face of the crystal 92 being 50° C. This resulted in a convex radius of curvature of 10 m. The effective value of "L" to be used in Equation 4 was 1.5 cm.

Similarly, the front face 96 of the crystal 95 illustrated in FIG. 6b may be made concave if liquid gallium is pumped through row 98 of cylindrical channels at a temperature $T_1$ greater than $T_2$, the temperature of the liquid gallium pumped through row 99.

Using this invention, control over heat transfer and the shape of the crystal can be accomplished by manipulating one or more of a number of variables, including: the amount of heat or cold applied to the surfaces; the type of fluids pumped through the channels for heating and cooling; the material of the crystal; the temperatures, directions of flow and rates of flow of the fluids; and placement of the channels. All of these features affect heat transfer within the crystal and in combination they provide wide flexibility in shaping a crystal to produce desired results.

Liquid gallium metal is used as a heat transfer fluid because it has both a high thermal conductivity and a high volume specific heat. Its low kinetic viscosity also facilitates its ability to remove heat, especially at the liquid-solid interface. Another special property of liquid gallium is its very low vapor pressure at elevated temperatures, $10^{(-12)}$ Torr at 100 degrees Celsius, $10^{(-11)}$ Torr at 300 degrees Celsius, etc. This means that if some gallium leaks into a high vacuum system it will not generate large volumes of gas and destroy the vacuum as would be the case with water cooling. The reverse will happen. The liquid gallium will slowly combine with the residual oxygen present and thereby pump on the system, improving the vacuum.

The melting point of gallium is 29.8 degrees Celsius. This is just above room typical temperature and means that if any gallium does leak out into the vacuum chamber it will freeze and remain where it falls, with a vapor pressure even lower than that of the liquid. The 29.8 degrees Celsius melting point is low enough that the gallium can be kept in the liquid state at temperatures close to room temperature. This is important in that it simplifies the thermal insulation problem for the cooling system and keeps the possible thermal stresses in the associated apparatus at a minimum.

Following is a table comparing the fluid properties of gallium and water. The "figure of merit" given in the last row is the product of the thermal conductivity and the specific heat per unit volume and is a good measure of the efficiency of the cooling fluid at low fluid velocities. Judged in this way, liquid gallium is 30 times as efficient as water.

TABLE 1

|  | Ga | H₂O |
| --- | --- | --- |
| Density (g/cm³) | 6.1 | 1.0 |
| Melting point (°C.) | 29.8 | 0.0 |
| Boiling point (°C.) | 2205.0 | 100.0 |
| Thermal conductivity (W/(cm °C.)) | 0.41 | 0.0068 |
| Volume heat capacity (J/(cm³ °C.)) | 2.2 | 4.2 |
| Viscosity (cP) | 1.61 | 1.0 |
| Kinetic viscosity (cP/(g cm³)) | 0.27 | 1.0 |
| Figure of merit | 0.90 | 0.029 |

Using gallium as a cooling fluid requires that a way must be found to pump it through the crystal with a minimum amount of vibrations or pulsations. Since liquid gallium is a liquid metal it can be pumped with an electromagnetic induction pump in a manner similar to the way liquid sodium is pumped through a high temperature reactor.

Figure 7A:
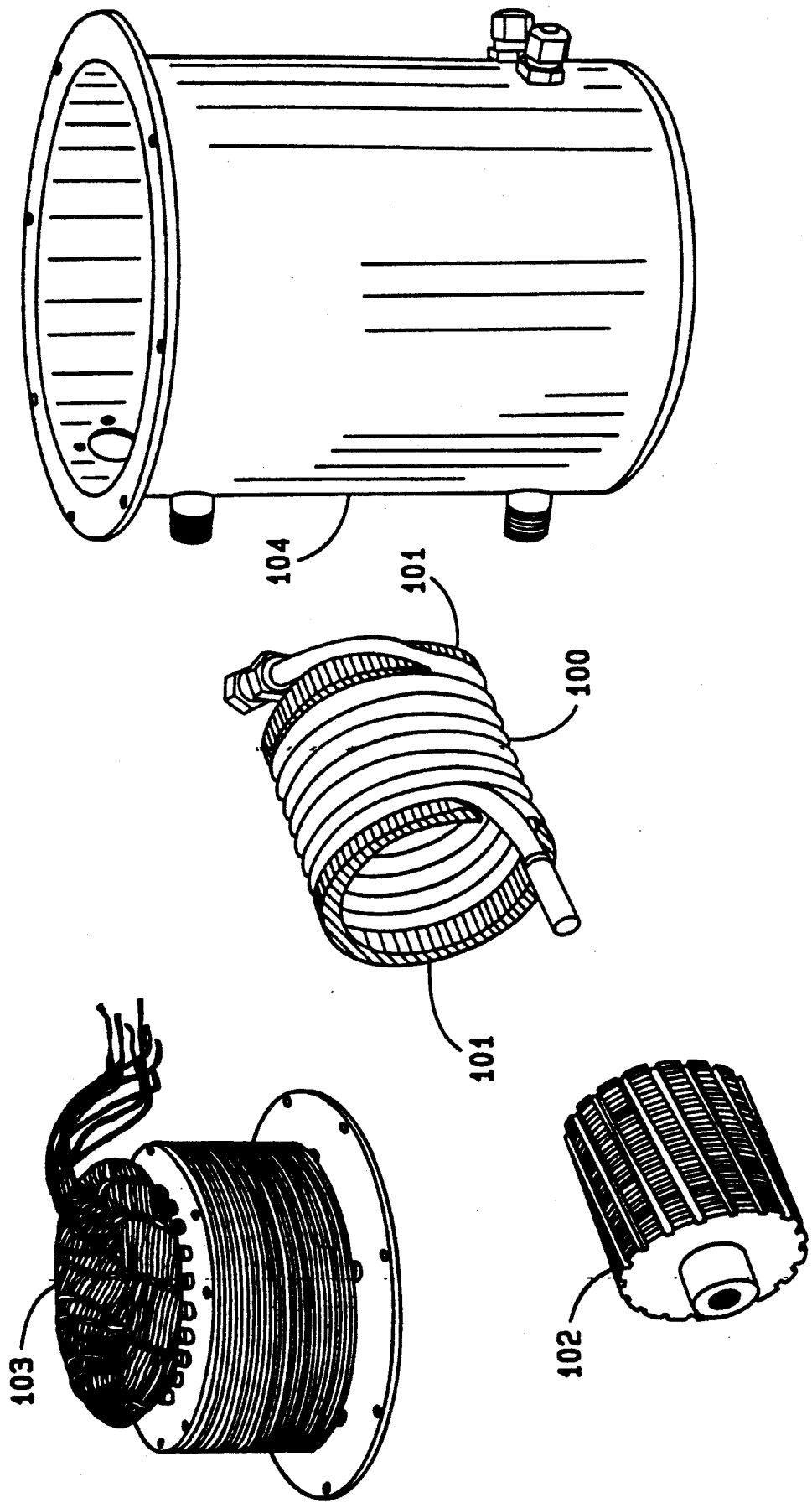
FIG. 7a depicts major components of an electromagnetic induction pump and FIG. 7b is a schematic showing the pump in a system used to move liquid gallium through the channels of a crystal diffraction lens.

The electromagnetic induction pump is constructed using components of a typical 5 hp., 3 phase induction motor. FIG. 7 shows major components before assembly. A stainless steel tube with three-eighths inch o.d. is formed into a spiral coil 100 through which will pass the liquid gallium. With eight or nine turns, the coil 100 is 3.5 inches high. The turns of the coil 100 are soldered together for improved electrical contact and a copper end ring 101 is soldered into each end of the coil 100. The rotor 102 of the induction motor is machined down to make room for the coil 100 between the rotor 102 and the motor windings and induction magnet assembly 103. A stainless steel housing 104 is provided.

During operation the rotor 102 remains stationary, and the rotating radial magnetic field in the motor induces a current in the gallium in the coil 100 that flows vertically, passing through each turn of the coil 100 perpendicular to the flow direction. This current interacts with the magnetic field and applies a force on the gallium that induces flow in the coil 100.

Figure 7B:
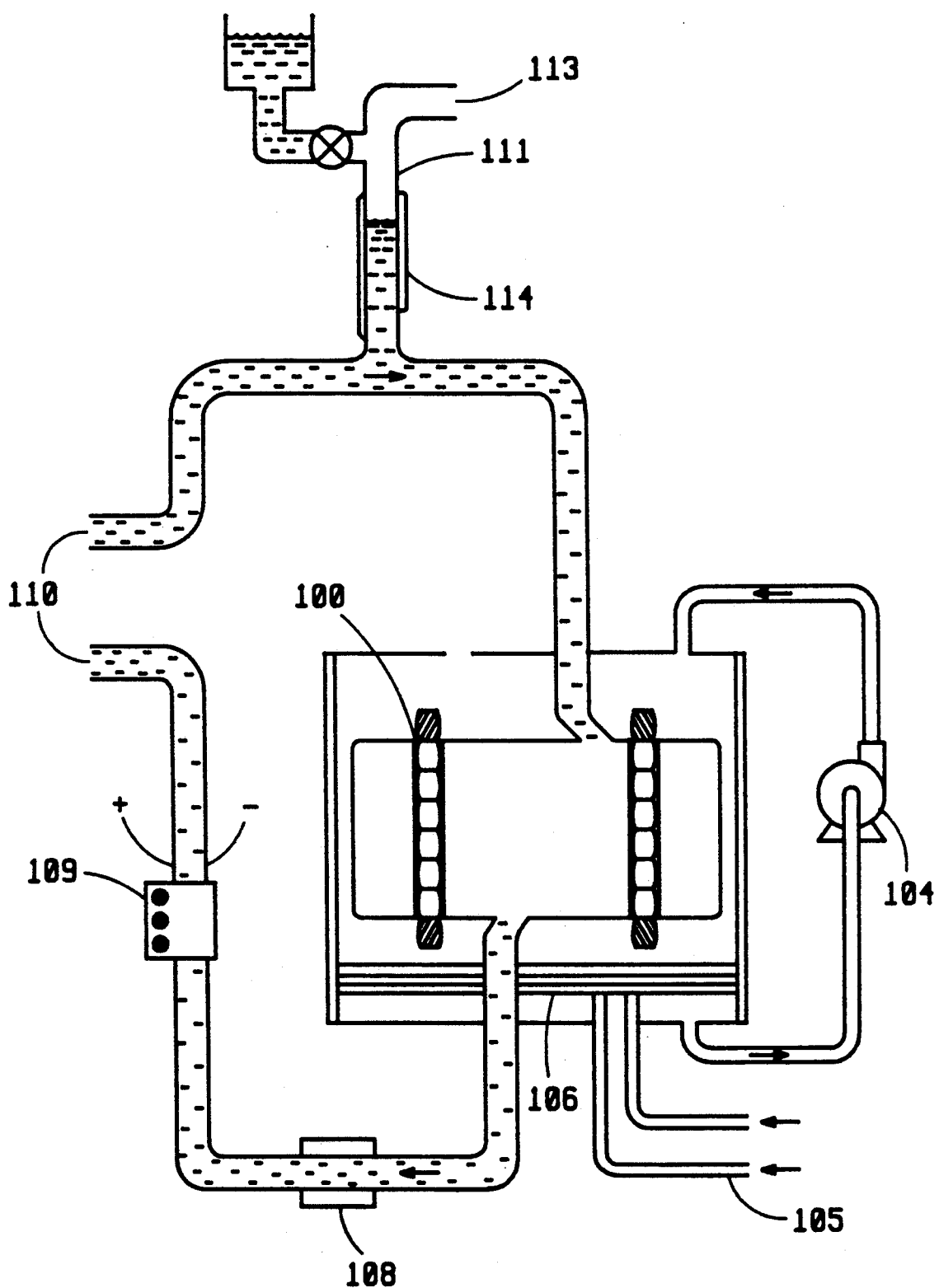

FIG. 7b is a schematic of the pump in a portable system which is capable of controlling the output temperature of liquid gallium and can handle heat loads of 10 kw. To begin operation, liquid gallium must 'wet' the inside of the spiral coil 100, or make good electrical contact with the coil 100 so that induced currents may flow. Gallium will wet 304 stainless steel at temperatures of about 750° F. Once wet the 304 SST will remain wet at lower temperatures. The liquid gallium pump is cooled using an oil pump 104 which circulates oil through channels in the motor assembly and heat is removed from the oil by a heat exchanger 106, cooled by a flow of water 105. A second heat exchanger 108 controls the temperature of the liquid gallium, while an electromagnetic flow meter 109 monitors the rate of flow of the liquid gallium to the diffraction crystal (not shown) at 110.

A stand pipe 111 maintains the integrity of the liquid gallium flow by accomodating the expansion and contraction of the gallium during temperature changes and maintains a significant pressure head at the inlet to the pump to avoid cavitation. A level indicator 114 triggers the filling of gallium, capped by the vacuum 113 or gas in which the pump operates.

Using this system, with a flow rate of 100 cm³/sec and a $\Delta T = 10°$ C., the heat transfer from a crystal would be 2.2 kw of power.

Alternate fluids may be used in combination with crystals of various materials to accomodate the heat generated by the photon beam. Following is a table comparing the thermal conductivity and coefficients of expansion of common crystalline materials:

TABLE 2

|  | Thermal Conductivity | Coefficient of Expansion |
| --- | --- | --- |
| Silicon | 1.5 | 3 × 10(−6) |
| Germanium | 0.6 | 6 × 10(−6) |
| Quartz (SiO₂) | 0.066 | 13 × 10(−6) |

The high energy beams of a synchotron may generate as much as several hundred watts per square centimeter on the crystal surface, and it would be desirable to use silicon crystals with liquid gallium cooling.

When using lower power beams generating less heat it would be desirable to use quartz crystals, because quartz has a higher coefficient of expansion and a smaller temperature gradient ($\Delta T$) would be required to effect a change in the focal length. In the latter case, cold and hot water could be used as cooling and heating agents, because the amount of heat flowing in the system is less. For the same reasons, when using a beam with a low heat load, germanium would be more desirable to use than silicon, though less desirable than quartz.

Control over the directions and rate of flow provides added control over heat transfer in a crystal, and may effect changes in the focal length as well as the "d" spacing in the crystal (spacing between planes in the crystal).

Figure 8A:
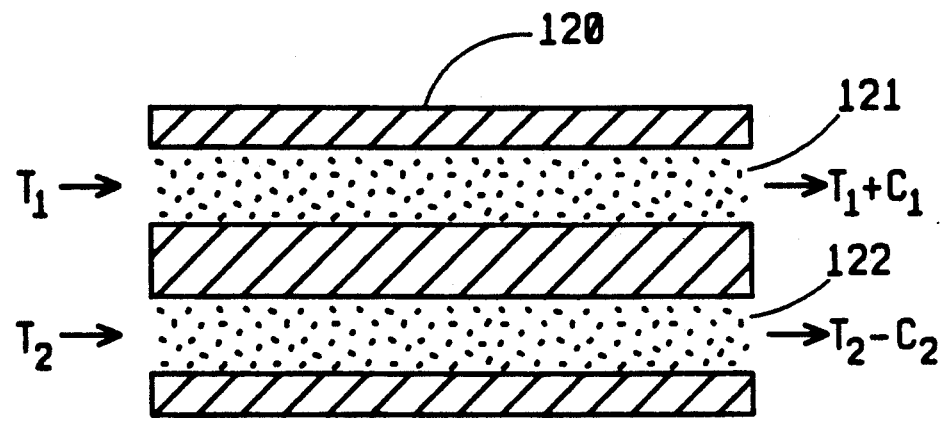
FIGS. 8a and 8b are schematics illustrating the effects obtained by controlling the temperature and direction of flow of the heating and cooling fluids in the channels in a diffraction crystal. The case shown in FIG. 8a for flow in both sets of channels in the same direction gives non-uniform bending, while the case shown in FIG. 8b for flow in opposite directions gives uniform bending (radius of curvature) over the whole crystal.

If the flow in the upper channels of the crystal is in the same direction as the flow in the lower channels, the temperature difference between the top and the bottom of the crystal will decrease as one moves through the crystal. The rate of decrease will depend on how fast heat is transferred from one set of channels to the other. FIG. 8a illustrates this effect. In a crystal 120 fluid flows in two channels 121 and 122, the temperature difference at the beginning is $\Delta T = T_2 - T_1$ and the temperature difference at the end is $\Delta T' = \Delta T - (C_1 + C_2)$ where $C_1$ and $C_2$ are the temperature changes of the fluids in the two sets of channels. This variation in $\Delta T$ will cause a variation in the radius of curvature of the crystal. The effect can be made small by increasing the flow rate in the channels 121 and 122 which decreases the changes in temperature of the fluids, $C_1$ and $C_2$.

Figure 8B:
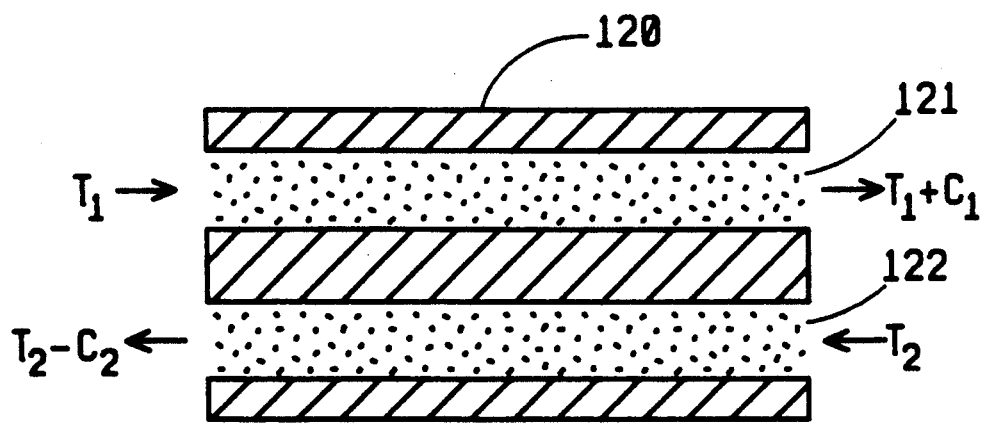

The effect can be eliminated completely by reversing the flow in one of the channels. Referring to FIG. 8b, if the fluid in channel 122 is made to flow in the reverse direction, the temperature difference at the beginning is given by $\Delta T = T_2 - T_1 - C_2$ and the temperature difference at the end is $\Delta T = T_2 - T_1 - C_1$. By adjusting the flow rates in the two sets of channels so that the values of $C_2$ and $C_1$ are equal, one can make the temperature difference constant throughout the crystal. This constant temperature difference generates a spherical surface on the crystal. In both cases (FIG. 8a and FIG. 8b) the surface temperature increases as one moves from left to right on the crystal surface. This effect can be minimized by increasing the fluid flow in the channels.

The effect of this variation of temperature is to change the "d" spacing slightly as one moves across the surface of the crystal. ($\Delta d / d = \alpha T$). If a white beam is being diffracted, this will broaden the bandwidth or energy range of the diffracted beam. This effect can be compensated for by changing the radius of curvature of the bent crystal. If the change in "d" spacing is matched by the change in the value of sin $\theta$, in the Bragg condition equation (3) a constant value for the diffracted wavelength will be maintained over the full surface of the crystal. The net effect of this is to increase the focal length of the lens slightly. This change in surface temperature ($C_1$) is sensitive to the flow rates of the heating and cooling fluids. As the flow rates are decreased the change in surface temperature increases. $C_1$ = time in transit of the fluid through the crystal ($T_t$) times the heat transfer per sec (Q × Area of crystal) divided by the volume of the channels ($V_c$) times the specific heat per unit volume of the fluid ($C_p$).

$$C_1 = T_t Q A / C_p V_c \quad (10)$$

In a further embodiment of the present invention, a temperature gradient may be established between the major surfaces of a focusing element by combining the use of liquid cooling and heating channels with the use of other means to heat a major surface of the element.

Figure 9:
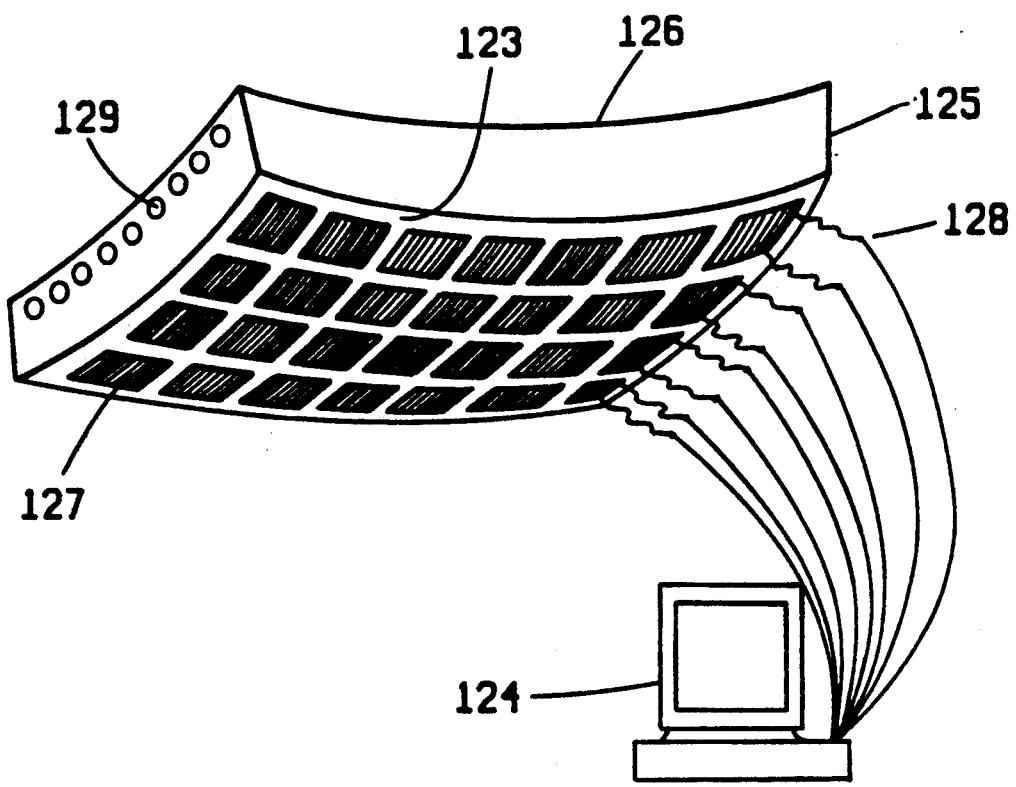
FIG. 9 is a schematic of a crystal diffraction lens in which both cooling/heating channels and a matrix of thin film resistors are used to establish temperature gradients between the surfaces of the lens.

As depicted in FIG. 9, in a crystal diffraction lens 125, cooling or heating fluid is pumped through channels 129, passing near the front surface 126. A matrix of thin film resistors 127 is mounted on the back surface 123 of the crystal 125. Each element in the matrix 127 is fed current through electrical connections 128 (only a few of which are shown) by a computer controlled power source (not shown). By means of a computer 124, current input into each element of the matrix may be precisely controlled to determine the precise temperature gradient at any point in the front surface 126 of the crystal 125. This embodiment allows second order focusing corrections, such as improving the resolution of the image or reducing the minimum spot size of the focused image of a point source. Additionally, by combining the use of cooling channels 129 with the use of a matrix of thin film resistors 127, it is possible to generate complex shapes for the front surface 126, such as parabolics or ellipsoids.

Using this invention, it is possible to construct an instrument which incorporates a variable focus crystal diffraction lens, thereby enhancing the instrument's flexibility and adaptability.

Figure 10A:
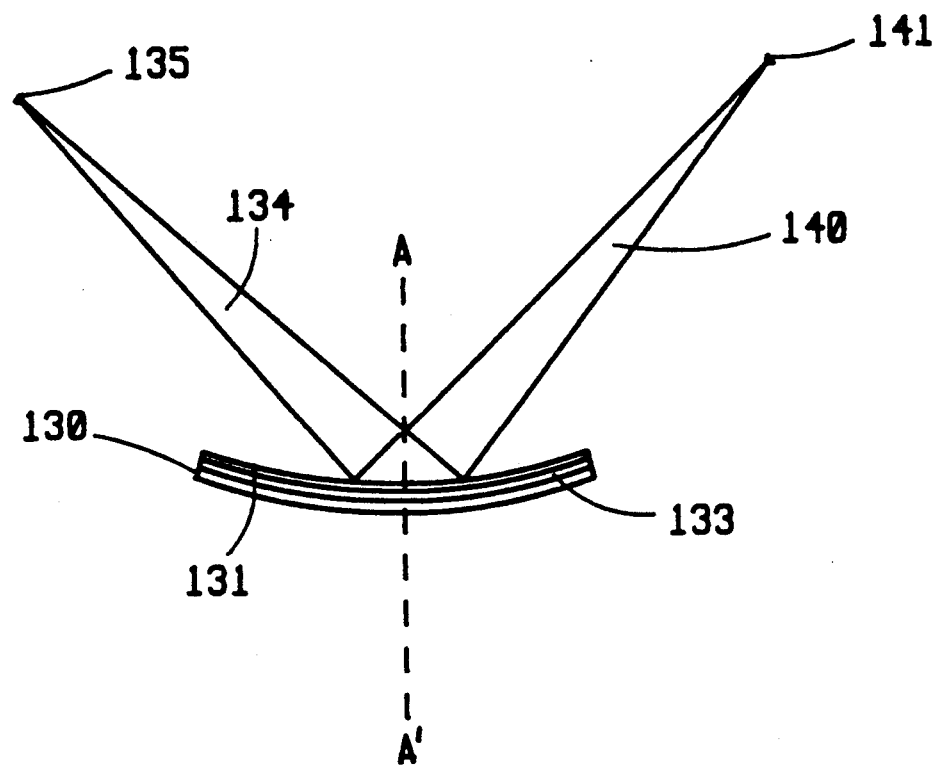
FIGS. 10a and 10b are schematics of instruments which incorporate variable focus crystal diffraction lenses.

For example, in FIG. 10a an instrument—such as a spectrometer—incorporates a variable focus crystal diffraction lens 130 which has been bent using this invention. Beam 134 from a point source 135 is directed to face 131 of lens 130 and diffracted by planar spacing 133 to form diffracted beam 140 for a detector (not shown) at point 141. It may be desired, for example, to change the angles of incidence and reflection of beams 134 and 140 without moving the point source 135 or the detector at point 141. This may be accomplished using this invention by changing the focal length of the lens 130 and then moving the lens 130 in a linear motion in the direction of A-A'.

If the $$\text{focal length} = \frac{K \sin\theta}{\alpha Q} \quad (9)$$

and if the distance from point source 135 to the axis A-A¹ and the distance from the detector at point 141 to the axis A-A¹ both remain constant, then, $$\text{focal length} = \frac{Y}{\cos\theta} \quad (11)$$

and $$Q = \frac{K \sin\theta \cos\theta}{\alpha D} \quad (12)$$

where "Y" is the perpendicular distance from the point source 135 to the axis A-A'.

Similarly, again referring to FIG. 10a, if the point source 135 must be moved and the detector remains at point 141, the incident angle of beam 134 may be changed by changing the focal length of the lens 130 and using a rocking motion on the lens 130 to direct the diffracted beam 140 to the point 141.

If the $$= \frac{K \sin\theta}{\alpha Q} \quad (9)$$

then, $$Q = \frac{K \sin\theta \times \text{constant}}{\alpha} \quad (13)$$

Figure 10B:
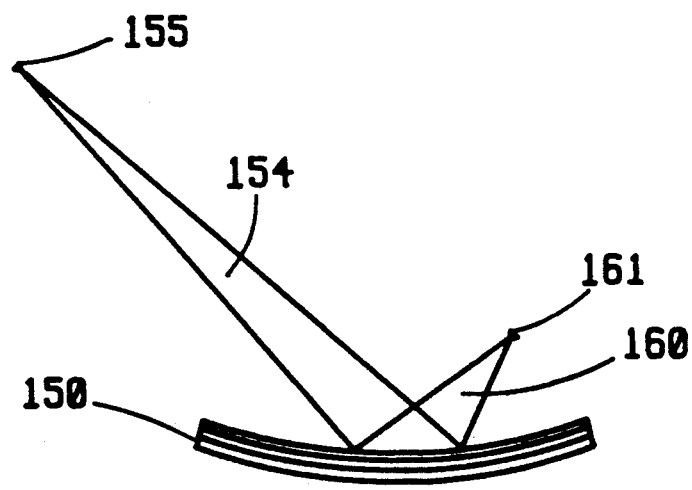

An instrument equipped with a variable focus lens is also able to adapt to changed needs for magnification and demagnification. In FIG. 10b, for example, beam 154 from a point source 155 is directed to lens 150 and diffracted to form beam 160. The line image 161 is one-fifth the size of the point source 155 if the beam 160 traverses a distance one-fifth of the distance of beam 154. Using this invention, the point source may be magnified or demagnified by altering the focal length of the lens 150 and moving the line image 161 to an appropriate distance.

The foregoing description of various embodiments of the invention have been presented for purposes of illustration and description. It is not intended to be exhaustive or to limit the invention to the precise forms disclosed, and obviously many modifications and variations are possible in light of the above teaching. The embodiments described explain the principles of the invention and practical application and will enable others skilled in the art to utilize the invention in various embodiments and with various modifications as are suited to the particular use contemplated. It is intended that the scope of the invention be defined by the claims appended hereto.

The embodiments of the invention in which an exclusive property or privilege is claimed is defined as follows:

1. A focusing element having a pair of opposite major surfaces separated from each other, the improvement comprising means for altering the focal length of said focusing element to provide a focusing element with any one of a plurality of predetermined focal lengths, said means including means for changing heat transfer in selected portions of said major surfaces by controlled quantities.

2. The focusing element of claim 1 wherein said focusing element comprises a diffraction crystal.

3. The focusing element of claim 1 wherein said means for changing heat transfer comprises a plurality of channels through which proceed one or more fluids, said channels passing parallel to and adjacent to at least one of said major surfaces.

4. The focusing element of claim 3 wherein said fluids are maintained at controlled temperatures.

5. The focusing element of claim 3 wherein said fluids proceed through said channels at controlled rates.

6. The focusing element of claim 3 wherein said channels are shaped as cylinders.

7. The focusing element of claim 3 wherein said channels are shaped as rectangles.

8. The focusing element of claim 3 wherein one of said fluids is water or steam.

9. The focusing element of claim 3 wherein one of said fluids is liquid gallium.

10. The focusing element of claim 3 wherein said channels are in two rows which are perpendicular to each other.

11. The focusing element of claim 10 wherein said fluids flow in opposite directions.

12. The focusing elements of claim 1 wherein said focusing element is a mirror and said predetermined focal length is the focal length of a spherical or ellipsoidal mirror.

13. A focusing element having a pair of opposite major surfaces and a width, the improvement comprising means for generating a thermal gradient between said major surfaces to alter the shape of said focusing element dependent upon said thermal gradient, wherein said means for generating a thermal gradient between said major surfaces comprises a matrix of thin film resistors mounted on at least one surface of said focusing element, said thin film resistors heated by a computer controlled power source.

14. A method of altering the focal length of a focusing element to any one of a plurality of predetermined focal lengths, said focusing element having two major surfaces separated from each other, comprising:

providing a focusing element with a plurality of channels passing through said focusing element, said channels passing parallel to and adjacent to at least one of said major surfaces, calculating quantities of change of heat transfer within selected portions of said focusing element which will result in alteration of the focal length of said focusing element, pumping one or more fluids through said channels, and varying the temperature and flow rates of said fluids so as to change heat transfer within selected portions of said focusing element by said quantities.

15. The method of claim 14 wherein said focusing element is a diffraction crystal.

16. The method of claim 15 wherein one of said fluids is liquid gallium.

17. The method of claim 14 wherein said channels are shaped as cylinders.

18. The method of claim 14 wherein said channels are shaped as rectangles.

19. An instrument which incorporates a crystal diffraction lens, the improvement comprising means for varying the focal length of said lens to provide a lens with any one of a plurality of predetermined focal lengths, said means including means for changing heat transfer within selected portions of said lens by controlled quantities.

* * * * *